United States Patent [19]

Brasher et al.

[11] Patent Number: 5,392,441

[45] Date of Patent: Feb. 21, 1995

[54] PUMP BUS TO AVOID INDETERMINACY IN READING VARIABLE BIT FIELD

[75] Inventors: Gary L. Brasher; James H. Nuckols; Jeffrey S. Watters, all of Houston, Tex.

[73] Assignee: Compaq Computer Corporation, Houston, Tex.

[21] Appl. No.: 143,529

[22] Filed: Oct. 26, 1993

Related U.S. Application Data

[63] Continuation of Ser. No. 789,613, Nov. 8, 1991, abandoned, which is a continuation of Ser. No. 303,543, Jan. 27, 1989, abandoned.

[51] Int. Cl.$^6$ .............................................. G06F 13/00
[52] U.S. Cl. ................................. 395/725; 364/240; 364/935.4; 364/DIG. 1
[58] Field of Search ............... 364/200, 900; 395/725

[56] References Cited

U.S. PATENT DOCUMENTS

| | | | |
|---|---|---|---|
| 4,447,878 | 5/1984 | Kinnie et al. | 364/200 |
| 4,467,447 | 8/1984 | Takahashi et al. | 364/200 |
| 4,504,906 | 3/1985 | Itaya et al. | 364/200 |
| 4,511,969 | 4/1985 | Koenig et al. | 364/900 |
| 4,683,534 | 7/1987 | Tietjen et al. | 364/200 |
| 4,723,204 | 2/1988 | Khera | 364/200 |
| 4,766,536 | 8/1988 | Wilson, Jr. et al. | 364/200 |
| 4,796,232 | 1/1989 | House | 365/189 |
| 4,831,513 | 5/1989 | Kanazawa | 364/200 |
| 4,831,514 | 5/1989 | Turlakov et al. | 364/200 |
| 4,845,611 | 7/1989 | Turlakov et al. | 364/200 |
| 4,866,309 | 9/1989 | Bonke et al. | 307/495 |
| 4,870,566 | 9/1989 | Cooper et al. | 364/200 |
| 4,901,283 | 2/1990 | Hanburg et al. | 365/222 |
| 4,961,136 | 10/1990 | Sato | 364/200 |
| 4,977,537 | 12/1990 | Dias et al. | 364/900 |
| 4,987,529 | 1/1991 | Craft et al. | 364/200 |
| 5,006,981 | 4/1991 | Beltz et al. | 364/200 |

FOREIGN PATENT DOCUMENTS

| | | |
|---|---|---|
| 0082980 | 7/1983 | European Pat. Off. . |
| 0143699 | 6/1985 | European Pat. Off. . |
| 0175526 | 3/1986 | European Pat. Off. . |

OTHER PUBLICATIONS

Intel Product Data Book "80386 High Performance CHM05 Microprocessor with Integrated Memory Management", 1987.

*Primary Examiner*—Thomas C. Lee
*Assistant Examiner*—Christopher Shin
*Attorney, Agent, or Firm*—Pravel, Hewitt, Kimball & Krieger

[57] ABSTRACT

A data field having a variable number of zero-level bits is read by a bus in a digital system, wherein the bus is pumped by writing all logical "one" bits onto the bus lines just before they are read. The unused bits will then be still in a logical "one" state, i.e. a known value, rather than floating or at an indeterminate value. A program for performing this operation in a computer uses steps to prevent other operations such as refresh cycles or interrupts from being interposed between the write and read cycles. A CPU may use this method to read a system identifier value upon boot-up, for example.

19 Claims, 5 Drawing Sheets

| LINE NUMBER/ CYCLE COUNT | INSTRUCTION / OPERANDS | DESCRIPTION |
|---|---|---|
| 1 (4) | PUSHF | ;preserve needed registers and flags |
| 2 (2) | PUSH dx | ;preserve register dx |
| 3 (2) | MOV dx,MACH_ID_REG | ;load address of ID byte into dx |
| 4 (8) | CLI | ;disable interrupts to processor |
| 5 (26) | IN al, PPI | ;read PPI for refresh status |
| 6 (2) | MOV ah, al | ;move current status to register ah |
| 7 (2) | NOT ah | ;complement so that "refresh bit" is in the state we will be looking for |
| 8 (2) | AND ah, PPI_REFRSH | ;mask PPI word to isolate "refresh bit" |
| 9 (26) | IN al, PPI | ;read PPI for refresh status again |
| 10 (2) | AND ah, PPI_REFRSH | ;mask to isolate "refresh bit" |
| 11 (2) | CMP ah, al | ;compare two versions of "refresh bit" |
| 12 (7) | JNE Line 9 | ;if "refresh bit" has changed, continue otherwise, return to beginning of loop |
| 13 (2) | MOV al, 0FFh | ;load "ones" into register al |
| 14 (24) | OUT dx, al | ;"pump" data bus before reading ID register by writing "ones" to dx |
| 15 (26) | IN al, dx | ;read ID register |
| 16 (2) | AND al, MACH_ID_MASK | ;mask to isolate machine ID bits |
| 17 (5) | POP dx | ;restore contents of dx |
| 18 (5) | POPF | ;restore state of processor |
| 19 (8) | STI | ;re-enable interrupts |
| 20 | RET | ;return to calling routine |

TOTAL CYCLES FOR SUBROUTINE = 157 (EXCLUDING LOOP 9-12)

PUMP BUS TO AVOID INDETERMINACY IN READING VARIABLE BIT FIELD

This is a continuation of application Ser. No. 07/789,613, filed on Nov. 8, 1991, now abandoned which is a continuation of application Ser. No. 07/303,543, filed on Jan. 27, 1989.

BACKGROUND OF THE INVENTION

This invention relates to digital computers, and more particularly relates to accessing a variable bit field by a computer bus.

Binary digital circuits used in data processing systems typically operate with logical zero and logical one levels, represented as low or high voltages on conductive lines or busses which connect various components of the system together. Since wiring together each of the components in a system on a point-by-point basis is not economically or functionally feasible, due to the enormous number of required connections, a bus is commonly shared among many of all system components. A shared bus provides a set of parallel, bidirectional conductive pathways between a plurality of system modules. Each line of a shared bus distributes a digital signal from the source of that signal to all the other modules interfaced to the bus. A module interfaced to a shared bus may thus assume the role of a bus driver or a bus receiver, or both.

A bus driver is an active device that can change the logical level appearing on the bus line it is driving. As each module capable of driving the bus has its own bus drivers, some mechanism must be provided to avoid bus contention. Bus contention is a situation in which two or more modules attempt to drive the bus simultaneously. Components interfaced to a shared computer bus must accordingly take turns driving the bus, so that two or more components do not attempt to drive conflicting logical levels on it at the same time. Bus receivers, on the other hand, are passive devices which read the logical level on the line to which they are connected. Unlike bus drivers, more than one device can function as a bus receiver at the same time.

In order to overcome the contention problems which can arise from having multiple bus drivers in a computer system, two bus driver design techniques are commonly employed that allow more than one bus drive to be interfaced to a bus. They are: open-collector bus drivers, and tri-state bus drivers. Open-collector bus drivers can only pull a bus line down to a logical zero voltage, thus avoiding the situation where one driver attempts to pull the level high, while another driver tries to pull the level low. A high level is passively produced on the bus line (only when no driver is pulling the level low) by means of a "pull-up" resistor between the bus line and a supply voltage level Vcc. The output of an open-collector driver can thus assume one of two distinct states: either low, or floating. If any open-collector driver interfaced to a bus is pulling a line level low, no driver can pull that line high. If the output of a driver is floating, the output level for that driver is determined by the signal on the bus line, either high or low.

A tri-state bus driver is a device whose output can assume one of three distinct states: a logical "zero" with the output actively pulled down to ground; a logical "one" with the output actively pulled high; and a high-impedance state in which the output is floating, exhibiting a high impedance to both ground and the supply voltage, Vcc, and is electrically isolated from the driver circuitry. As long as only one tri-state driver is applying data at any given time to a bus line, the presence of a plurality of drivers will not cause contention problems.

Bus drivers and receivers can be fabricated using a number of available semiconductor technologies, including NMOS, TTL, low-power Schottky TTL, or CMOS. I/C devices made using each of these process technologies are characterized by a number of electrical properties, including the threshold values that determine whether a voltage is considered "high" or "low" by devices in that family. For NMOS logic elements, for example, any voltage higher than 2.0 volts is considered a "high" level (a logical "one"), while any voltage lower than 0.8 volts is considered a "low" level (a logical "zero"). In order to ensure proper operation of an NMOS logic circuit, therefore, these threshold values must be met by all inputs to that circuit. A voltage presented to an NMOS device that falls between the low and high thresholds, (i.e. between 0.8 and 2.0 volts) is considered to be indeterminate, and behavior of the circuit in such a case is unpredictable.

When a bus line is driven by tri-state drivers, indeterminate voltages can appear on the bus lines in situations where no driver is currently enabled. If such a floating value is read by a bus receiver, the value obtained by the receiver is unpredictable, leading to potentially erroneous results. It is accordingly undesirable to read a value on an undriven bus line.

In some situations, it may be useful in minimizing driver logic to use only a selected subset of the multiple lines in a shared bus. If an eight-bit value is to be passed along a sixteen-bit bus, for example, it may not be necessary to drive the eight unused lines, so long as the receiver logic knows not to use the indeterminate values which will appear on these eight lines, e.g., by "masking". This is only possible, however, if it is known beforehand which bus lines will be driven and which ones will not. The receiver logic cannot determine at the time it is reading a bus whether to interpret the voltages on individual bus lines as either high, low, or indeterminate.

It is accordingly an object of the present invention to provide a method for correctly reading a plurality of bus lines, in the case that an unknown or varying number of those lines may be driven or not driven. Another object is to provide an improved method of supplying variable-bit field type of data in a computer system, without requiring masking or additional driver or clamp circuitry.

SUMMARY OF THE INVENTION

In one embodiment, the present invention provides a method for the reading of bus lines in the situation where not all of the bus lines are driven with a logical value. Under normal circumstances, a bus is read only when some module is driving all of the lines on the bus. When a bus is driven with tri-state drivers, the logical value on an individual bus line is indeterminate if no driver is currently driving that line.

One way to reduce the amount of circuitry required to construct a tri-state bus driver is to allow that driver, when activated, to control the logical levels on only a subset of all the lines in a bus, and leave the remaining bus lines undriven (tri-stated). When reading a bus driven by such a bus driver, it is impossible for a bus receiver to determine which lines are actually being driven with valid logical levels, and which bus lines are just floating, since the floating lines could equally likely have voltages either in the high or low logical range of the receiver. According to the method of the present invention, therefore, the values on all of the individual bus lines are "pumped" up to a high logical level just before being driven by a driver that controls only a subset of the total number of lines in the bus. The intrinsic capacitance of bus lines causes the high voltage on the undriven bus lines to decay at a relatively slow rate after being "pumped", so that if the undriven lines are read quickly enough (for example, in the next instruction cycle) they will be interpreted by the receiver as though they were driven high. The subset of lines that are actually being driven will behave in a normal way. In this way, a bus with only some of its lines actually being driven can be read in a predictable way.

BRIEF DESCRIPTION OF THE DRAWINGS

The novel features believed characteristic of the present invention are set forth in the appended claims. The invention itself, however, as well as other features and advantages thereof, will be best understood by reference to the detailed description of a preferred embodiment, when read in conjunction with the accompanying drawings, wherein:

DETAILED DESCRIPTION OF A PREFERRED EMBODIMENT

Figure 1:
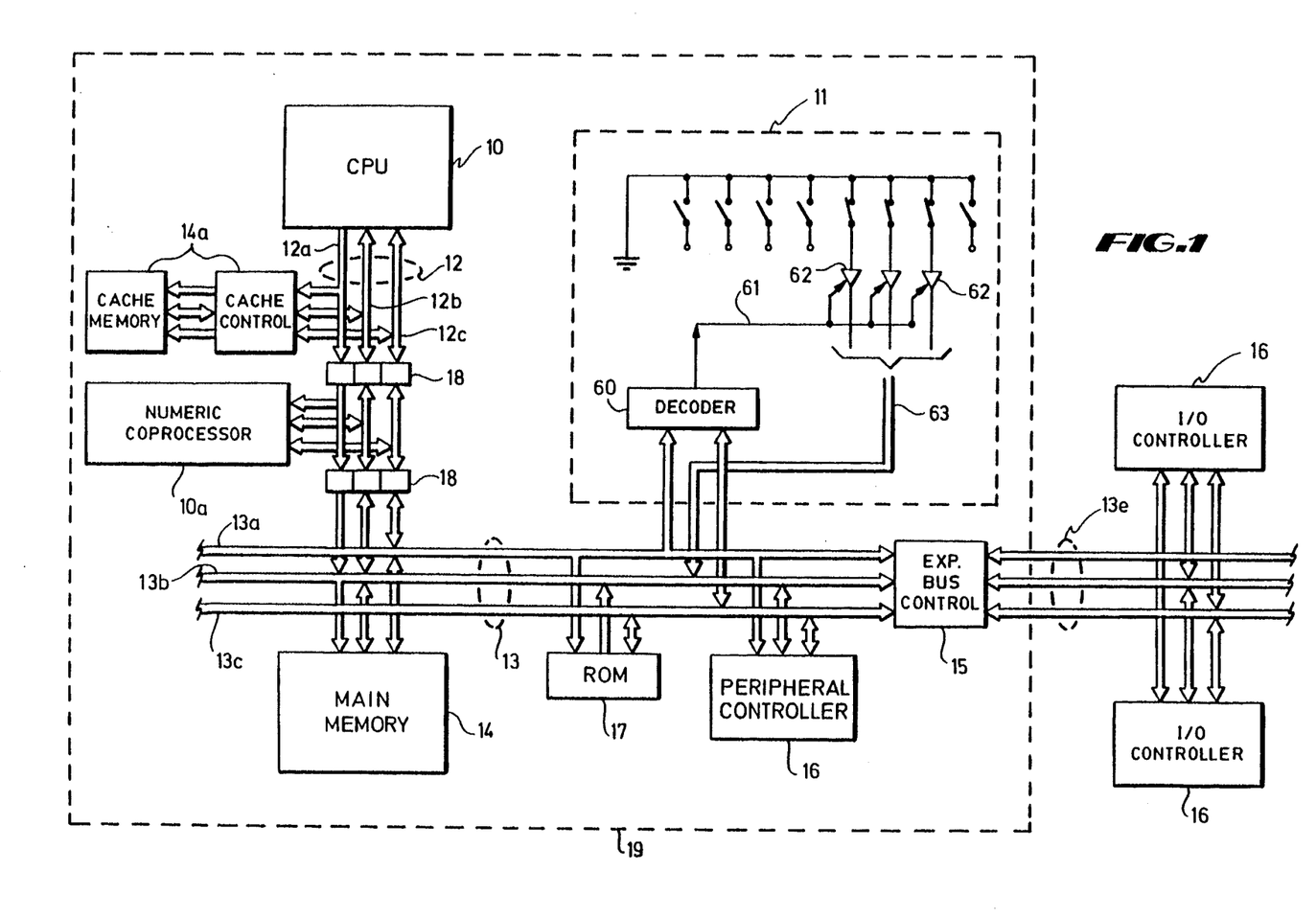
FIG. 1 is an electrical diagram in block form of a computer system which uses features of the invention.

Referring to FIG. 1, a digital computer system which may use features of the invention is illustrated. This system includes a CPU 10 which in a preferred embodiment is an Intel 80386 32-bit microprocessor, or an Intel 80386SX 32-bit microprocessor with 16-bit external data bus may be used. Of course, the features of the invention are applicable to computer systems using other types of microprocessor chips or CPUs.

According to an illustrative embodiment of the invention, a system-identification or "ID code" is provided at an addressable ID code location 11 accessed by the CPU 10, as will be explained. This location 11 containing the ID code is read when the computer is powered-on or rebooted, for example, although it may also be read when an applications program is Started. This ID code may indeed be stored in a non-volatile RAM location after once being read from the hard-wired location 11, then in subsequent boot-up the non-volatile RAM location is read instead of the location 11. In any event, the location 11 is accessed in the ordinary use of the computer system only rarely, so high performance is not important.

The microprocessor or CPU 10 is connected by a local bus 12 to a system bus 13 which logically connects the various components of the system, including the CPU and the location 11 to be accessed. If a 80386 CPU chip is used, the local bus 12 and the system bus 13 include twenty-four lines 12a or 13a (could be up to thirty-two address lines, but not needed at present), thirty-two data lines 12b or 13b and a number of control lines 12c or 13c. On the other hand, if an 80386SX device is used, the address busses 12a and 13a are 24-bits as before, and the data busses 12b and 13b are 16-bits wide. Also present in the system is a main memory module 14 which is in a logical address space of 4-gigabytes for an 80386, but only 16-Mbytes for a twenty-four bit address bus, although usually about 1-Mbyte is physically present. This memory module includes memory controller circuitry, usually supporting DRAM devices with multiplexed addresses.

The system bus 13 is extended to an expansion bus 13e through an expansion bus controller 15 functioning to buffer the high-speed system bus to a slower clock speed used on the expansion bus, and, in the case of the 80386 system, to change from a 32-bit data bus to a 16-bit data bus, and also to accommodate 8-bit expansion cards. The location 11 for storing the ID code could be located on this expansion bus since speed of access is not at all important, but a convenient circuit exists for including it on the high-speed system bus 13; a gate array or programmable array logic (PAL) device or the like usually is needed for various other purposes and this ID location 11 function can be added with almost no additional cost and no added circuit connections upon assembly of the motherboard. The function could be located on the local bus 12, as well. An instruction executed by the CPU 10 which accesses a device on the expansion bus 13e will use more machine cycles to complete due to these clock speed transitions made in the controller 15, and so extra cycles are allowed for an I/O read or write, compared to a read or write to main memory 14, for example. Since the location 11 is accessed only once when the computer is powered-on, it is of no consequence that the access time is slow.

The system also includes a number of input/output (I/O) controller devices 16, for accessing various devices such as network adapters or modems, expansion cards and disk drives, for providing facilities for user interaction with the system, or for providing additional bulk-storage facilities for the system. Depending upon the speed needed, these I/O devices may be located on the expansion bus 13e or the main (high speed) system bus 13. A peripheral I/O controller 16 for the keyboard is usually on the system bus, while disk drives, being inherently slow, are on the expansion bus.

Usually ROM storage 17, consisting of a number of ROM devices, is connected to the system bus 13 to be accessible from the CPU 10 for some of the fixed code, such as power-on initialization or part of the operating system. The code used to identify the system configuration, as referred to herein, is ordinarily included in the ROM 17 and executed directly from the ROM, rather than being in a disk drive accessed by an I/O controller 16 and loaded to RAM memory 14 for execution.

The busses 12 and 13 can be controlled by different devices, at the same time; the processor 10 can be accessing a cache controller and cache memory 14a, and/or numeric coprocessor 10a on the local bus 12, while a disk drive operated by one of the controllers 16 is transferring data to the main memory 14 using DMA. To this end, the local bus 12 is separated from the system bus 13 by buffers or latches 18 operated by a controller receiving the control bus signals and bus arbitration signals. In this manner, addresses and data, and corresponding control signals, are not applied to the system bus, even though present at the CPU output, unless the controller has received the proper commands and has ownership of the system bus. Likewise, data on the system bus is not allowed onto the local CPU bus until the controller sees the proper commands from the CPU. In this manner, the CPU 10 can communicate with other devices on the local bus 12 without tying up the system bus 13.

The CPU 10, main memory 14, expansion controller 15, some of the I/O controllers 16, ROM 17, and numeric coprocessor and/or cache memory and cache controller (if present in the system) are all mounted on a motherboard 19. The location 11 for storing the ID code is likewise mounted on the motherboard. Other components of the system such as the main power supply, disk drives, network adapter or modem, etc., are mounted in the same housing as the motherboard, but in separate assemblies or on separate boards, in typical systems. Usually, the video display and keyboard are external to this housing. Supply voltages to all of the components on the motherboard 19 and otherwise included in the system of FIG. 1 is provided from a power supply in the same housing.

Figure 2:
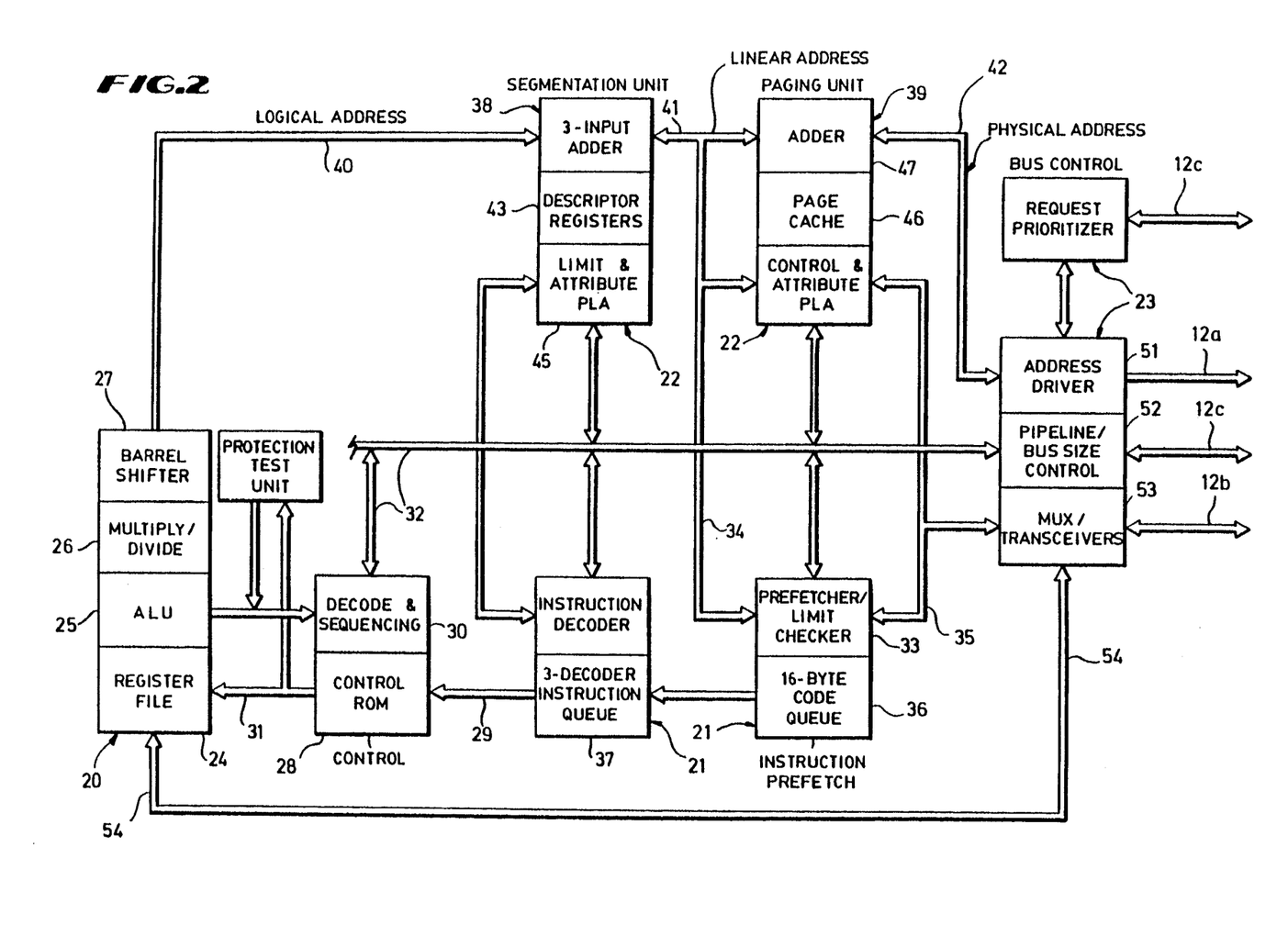
FIG. 2 is an electrical diagram in block form of the CPU of the system of FIG. 1.

Referring to FIG. 2, the CPU 10 of the 80386 or 80386SX type used in the illustrative embodiment is a high performance microprocessor including an on-chip memory management unit providing virtual memory support. The microprocessor is of the microcoded type, using "pipelining" or overlapped instruction execution, and generally includes an execution unit 20, an instruction unit 21, a memory management unit 22, and a bus interface unit 23. The internal data paths are 32-bit for either device, but the 80386SX has a 16-bit external data bus 12b while the 80386 has a 32bit external data bus 12b.

The execution unit 20 performs arithmetic and logic operations on operands and addresses fetched from memory 14 or I/O space. The execution unit includes a register file 24 containing a number of general purpose 32-bit registers for holding operands and results, as well as addresses to memory or I/O space. In the unit 20, a 32-bit wide ALU 25 performs the arithmetic or logic operation defined by an instruction; a multiply/divide circuit 26 executes certain instructions using multiply or divide, and a barrel shifter 27 can execute 0-to-64 bit shifts on data being inputted to the ALU. Microinstructions stored in a control ROM 28 define the operations performed in the execution unit. The microinstruction routines arc selected by an entry point derived from the current instruction and applied to an input 29, and the microcode sequence within a routine is determined by a sequencer 30, based upon a microaddress produced by the last microinstruction and conditions within the processor. Control signals produced by a microinstruction are applied to the execution unit 20 via bus 31, and to the other units of the CPU chip via internal control bus 32.

The instruction unit 21 functions to fetch and decode instructions of the instruction stream. A prefetch unit 33 outputs addresses via bus 34 through the memory management unit 22 and the external address bus 12a to the memory 14 or ROM 17, and receives instructions back via external data bus 12b and bus 35, to fill an instruction queue 36 with the next sixteen bytes in the instruction stream, based upon an instruction pointer in the register file 24. An instruction consists of an opcode of one or two bytes, usually followed by one or more bytes of mode specifiers, address displacements and/or immediate data, so an instruction can be from one byte to six or eight or more bytes in length. A decode unit 37 receives instructions from the queue 36, decodes the optodes to generate entry point addresses for the control ROM 28, and determines what bytes are specifiers, displacements or immediate data and transfers the appropriate information to other units of the processor; this decode is three-deep, i.e., the next three decoded instructions are being processed at one time. This instruction unit is where the I/O instructions as used to access the ID code location 11 or other such I/O space locations are recognized upon being initially decoded, so the distinction between memory access and I/O access can be implemented.

Figure 3:
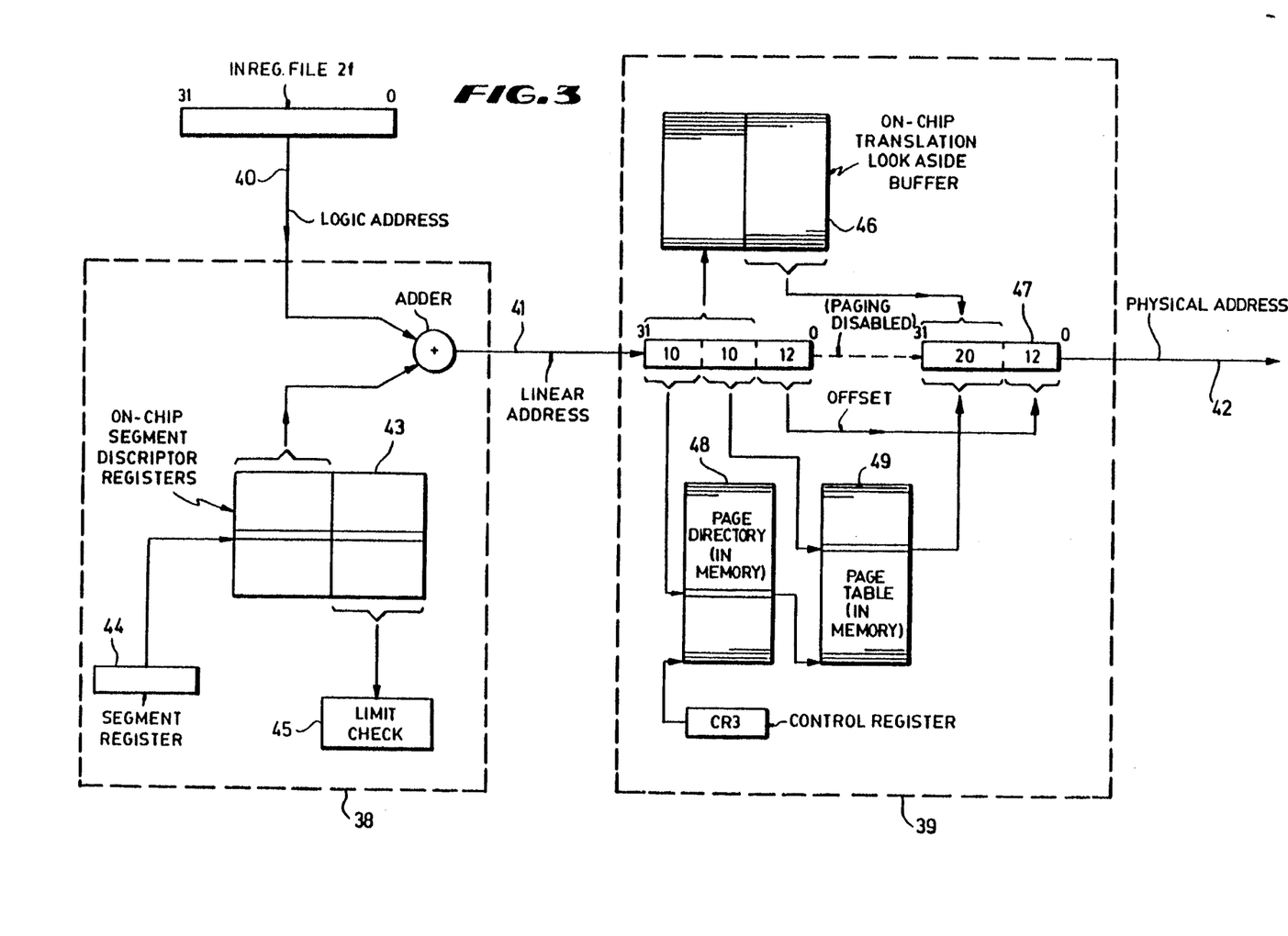
FIG. 3 is an schematic representation of the memory management scheme used in the CPU of FIG. 2.

The memory management unit 22 of the CPU 10 of FIG. 2 includes a segmentation unit 38 and a paging unit 39 used for accessing memory 14 or ROM 17, but not I/O devices 16 or location 11. A 32-bit logical address produced on bus 40 by the execution unit 20 is translated by the segmentation unit 38 into a 32-bit linear address on bus 41, and then translated into a 32-bit physical address on bus 42 by the paging unit 39. Referring to FIG. 3, the segmentation unit 38 adds the logical address on bus 40 to a base address from segment descriptor registers 43; one of the descriptor registers 43 is used depending upon the instruction type and an offset from a base address in the descriptor register is selected by the contents of a segment register 44. The segment discriptors contain not only the base address for the segment, but also the limits of the segment (its size) and the level of protection. The sum of the logical address on bus 40 and the base address for the segment, if the limit and attribute checker 45 in the segmentation unit finds the address to be proper, becomes the linear address on bus 41. If paging is disabled, this linear address passes through the paging unit 39 without change and becomes the physical address on bus 42. If paging is enabled, the linear address is first tested to see if the page address is found in a page cache 46 (a set associative translation lookaside buffer); bits 13–31 of the 32-bit linear address are compared to the thirty-two most recently used page addresses stored in the cache 46, and if a match is found the page address for this entry is forwarded to an adder 47 which produces the physical address on bus 42 using the page address and the lower 12-bit offset from the linear address. If the page is not found in the cache 46 (the hit rate is perhaps 98%), the page must be looked up in a page directory 48 and a page table 49 which are stored in memory 14. The upper 10-bit part of the 32-bit linear address is used to select 1-of-1024 entries in the page directory 48, producing the base address of the page table 49, then the next 10-bit part of the linear address is used to select 1-of-1024 of the entries of this page table, producing the translated page address used as an input to the adder 47 as before. The page entries have protection bits, similar to the segment entries, so several modes of protection are available. The segmentation and paging units 38 and 39 are used to translate addresses to memory 14 or ROM 17, but not I/O addresses, however, so when the ID code location 11 or controllers 16 are addressed to transfer data, commands or operands these are always at fixed physical addresses in the I/O space.

The bus interface unit 23 includes an address driver 51 functioning to generate the 24-bit or 32-bit address on external bus 12a along with the byte-enable bits BE0-BE3 (for 80386 devices, not 80386SX) which are part of the control bus 12c. When a new valid address is driven onto the bus 12a, an address status line ADS# is asserted in the control bus 12c. The outgoing addresses may be pipelined if a next-address signal NA# is asserted in control bus 12c by an external device; instead of waiting until a Ready line is asserted to produce the next address, a pipeline control circuit 52 produces a new address every cycle from the driver 51 if it has received the NA# signal. All incoming and outgoing data (including the all-ones written to location 11 to "pump" the bus, as will be explained) is controlled by multiplexer/transceivers 53 connected to the external data bus 12b; these transceivers use tri-state buffers, as do all nodes that drive the busses. Data to or from the execution unit 20 is coupled to the transceiver 53 via bus 54, or instruction stream data to fill the queue 36 is coupled from transceiver 53 via bus 35. Interrupts and bus arbitration are handled by a request prioritizer 55 which receives HLDA, INTR, NMI, ERROR# and BUSY# signals from the control bus 12c, and generates HOLD signals to the control bus 12c. Definitions of these control bus signals are contained in Table A.

The microprocessor of FIG. 2 is pipelined in that during a given machine cycle several instructions are executing at various stages at the same time. An instruction loaded to the prefetch queue 36 in one machine cycle will be decoded in the unit 37 in the next machine cycle, generating a microinstruction output from the control ROM 28 in a third cycle, causing the execution unit 20 to perform some operation in a fourth cycle, then the result is written to a register of the file 24 in a fifth cycle. Of course, execution of other instructions overlap this instruction. During stalls. the pipeline does not advance, but instead each stage of the pipeline maintains its state.

Figure 4:
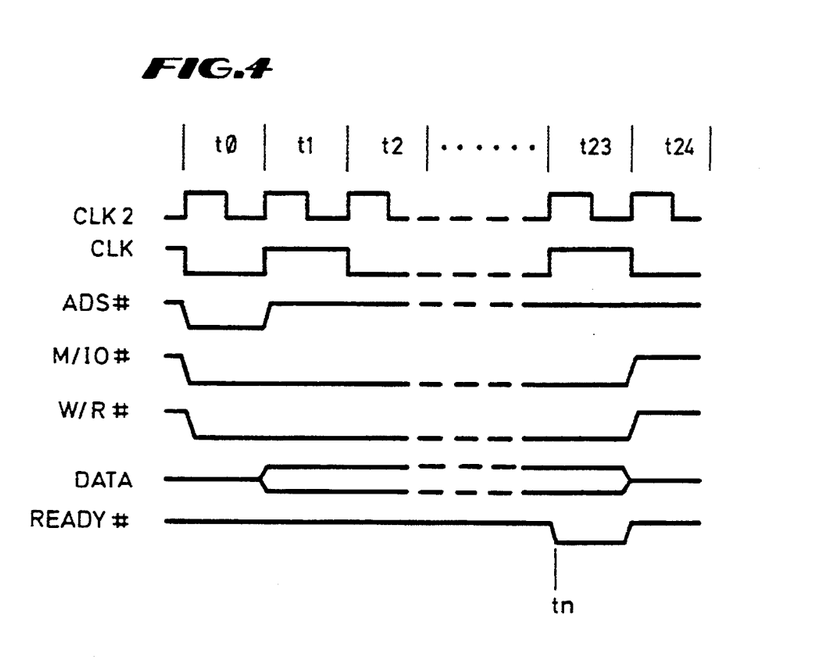
FIG. 4 is a timing diagram of voltage or events vs. time for I/O write cycles performed by the CPU to access the ID code identifier byte in the system of FIGS. 1-3 according to this embodiment of the invention.

Referring to FIG. 4, an I/O write bus cycle is illustrated in which the CPU 10 writes a command or data to one of the data I/O controllers 16, for example, or writes to the ID code location 11 in the method of the invention. During the first Clk cycle, t0, the address strobe ADS# is asserted on bus 12c by the CPU 10 along with the control signals M/IO# and W/R# indicating this to be a write to I/O space; at the same time, the address is driven by the CPU 10 onto bus 12a and detected at an address decoder 60 for the ID code location 11 after propagating through the buffers 18 in this cycle. The address also propagates through the expansion bus controller 15 and reaches the devices on the expansion bus 13e in some subsequent clock cycle, so to accommodate this the delay cycle I/O write cycle is extended, even if not needed for accesses on the system bus 13. Data is driven onto bus 12b by the CPU 10 beginning during the period t1. This write request is asserted onto the system bus 13 and expansion bus 13e, then the CPU 10 waits for an acknowledge that the write operation was completed before continuing with execution of the next instruction; thus the pipeline in the CPU 10 stalls for many cycles, until the READY# input is asserted at time tn. Assuming the system bus 13 is free, this write is carried out immediately, but even so a number of stall cycles are interposed. In the illustrated embodiment, an I/O cycle is set at 24-cycles in length, and the READY# signal is asserted onto the bus 13c during the time t23 of FIG. 4. This READY# signal may be generated in the decode and logic circuit 60, which is actually a gate array or PAL performing many functions unrelated to the ID code; that is, a READY# signal is generated a fixed number of cycles after an I/O access is detected on the system bus (M/IO# asserted low). It is in this manner that the location 11 is written, to "pump" the bus and avoid indeterminacy, as will be explained.

Figure 5:
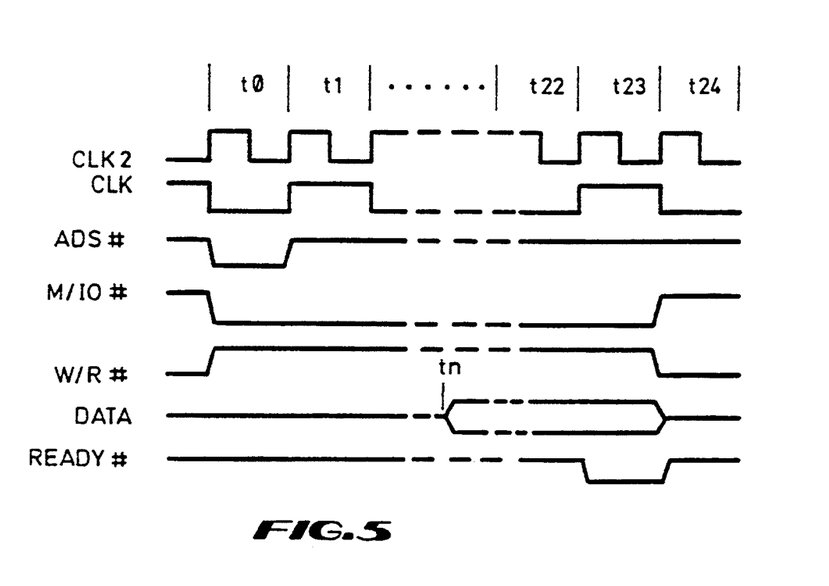
FIG. 5 is a timing diagram of voltage or events vs. time for I/O read cycles performed by the CPU to access the ID code identifier byte in the system of FIGS. 1-3 according to this embodiment of the invention.

A read cycle is shown FIG. 5, where the CPU 10 performs a read of the I/O address where the ID code location 11 is defined to reside. During t0, the ADS#, M/IO#, and the address bit are the same as for a write, but the W/R# signal on bus 12c is low, initiating a read operation. Again, assuming the system bus 13 is free, this read request is asserted onto bus 13 as soon as it reaches the local bus 12, then is transposed by the expansion bus controller 15 so it reaches the controllers 16 on the expansion bus a number of clock cycles later. In time tn, the decoder 60 has recognized the address and read request and the data of the ID code location has been asserted onto the system data bus 13b and has propagated back onto the local bus 12b, so the READY# response to the CPU 10 can be asserted to terminate the bus read cycle.

The data busses in the local bus 12, the system bus 13 and the expansion bus 13e are all driven by more than one transmitter source, and so to avoid a situation where one source is interfering with another these data busses are all driven by tri-state buffers. Only one of these drivers is allowed to drive a bus at any one time. Techniques for designing or fabricating tri-state bus drivers are well known in the art, and a wide variety of tri-state drivers are available from various semiconductor manufacturers. The output of a tri-state driver can either follow its input (a non-inverting buffer), or logically negate its input (an inverting buffer). The input signal that enables and disables the buffer can either be active-high or active-low. With an active-high enable input, the output of a non-inverting tri-state buffer will follow its input whenever the enable input signal is high, and the output will be effectively isolated from the driver whenever the enable input is low.

In the system of FIG. 1, the CPU 10, the cache controller (if any) and the buffers 18 are interfaced to the local bus 12, while buffers 18, memory module 14, ROM 17, expansion bus controller 15 and decoder (PAL) 60 are interfaced to bus 13, by tri-state buffers. Some of the tri-state buffers function as bus drivers, while others function as bus receivers. Each of these tri-state buffers has an associated Enable input which is used to enable or disable the corresponding buffer. The Enable inputs are activated and deactivated by control logic (not shown) associated with each device in such a way that the busses 12 or 13 are never driven by more than one device at a time. These Enable inputs are controlled by signals from bus interface units which respond to commands such as Address Strobe, Data Strobe, Bus Request, Bus Grant, and the like, of Table A, as is the usual practice.

The decoder 60 in the ID code location 11 produces an Enable signal on line 61, and this signal is used to activate three tri-state buffers 62 to drive three bits of the low-order byte of the system data bus 13b via output lines 63 from these buffers. The inputs to these buffers 62 are hardwired zeros, positioned in an 8-bit byte corresponding to the ID code for this particular computer system. The remaining five bits of this byte are not driven to the opposite logic state (logic one or +5V), according to the invention, but instead these bits remain undriven or floating. Buffers capable of driving the system busses occupy a lot more space on chip, and consume more in terms of static power drain or current drain, compared to logic circuitry, and so it is advantageous to omit these buffers whenever possible.

Normal operation of the system of FIG. 1 proceeds in the following manner: In execution of an instruction the control circuitry for the CPU 10 causes an address to be driven on the address bus 12a by enabling the CPU address bus driver 51 and an Address Strobe signal ADS# is applied to the control bus 12c. Control circuitry for the system will ensure that the Enable signal inputs for all other bus drivers are deasserted, so that these tri-state buffers are in a high-impedance state and electrically isolated from the busses. The I/O address and controls on the bus 13 activate the decoder 60 to detect an address which falls in the I/O address space into which this location 11 is mapped. The location 11 responds to its address on the address lines 13a by driving the data corresponding to that address space location onto the data bus 13b. To accomplish this, control circuitry (a bus interface unit) for the decoder 60 asserts the Enable signal on line 61 (a Data Strobe signal) for the data bus drivers 62. The CPU data bus receiver 53 is enabled, allowing the data from the ID location 11 to be input to the CPU 10 and routed via internal bus 54 to the execution unit 20 for processing.

According to this embodiment of the invention, the single-byte location in the address space of the CPU reserved for holding the "ID byte" that identifies the system type is useful for allowing software to determine the type of machine on which the software is being executed. Often, the operating system retrieves this ID byte and stores it in memory 14 for later reference by applications programs.

Up to two hundred fifty-six unique system types can be identified in an ID byte of 8-bits. This is more than adequate, however, since most computer systems are available only in one of several different types. In order to reduce the size of bus driving hardware in the I/O module that supports the ID byte function, therefore, only a subset of the eight bits in the ID byte need to be used. For example, the various possible system types could be represented by the collection of 8-bit bytes which contain three "zeroes" (i.e. 00011111, 10001111, 11000111, 11100011, 11110001, 11111000, 10110011, etc...). The circuit shown in FIG. 1 is configured to return the code 11110001. Only zeros, never ones, are used as the asserted bits in this example. The circuit which returns such a system ID byte, therefore, requires only three bus drivers, provided that the "ones" are automatically produced on any undriven bus line.

As noted above, however, due to-the tri-state drivers, undriven bus lines carry indeterminate voltages that may be interpreted by a bus receiver as either high or low. According to the present invention, therefore, a bus that is to be partially driven is first "pumped" with "ones" before being driven, then read immediately after being driven, so that lines which are not driven (tristated) retain the high voltage level and are appropriately interpreted as "ones".

Since the busses 12b or 13b are sets of conductive lines connecting the components of the system together, these busses can be thought of as simple transmission lines. Like any transmission line, the bus lines have an intrinsic resistance R, inductance L, and capacitance C, which affect the way electrical signals are propagated along the bus. In particular, the intrinsic capacitance C of the bus lines prevent an instantaneous voltage change on the bus from a low voltage level to a high voltage level, or from a high level to a low level. Instead, changes in voltage on the bus lines are subject to exponential voltage decay and growth rates proportional to the RC time constant of the bus.

In the ID code location 11 in the system of FIG. 1 the buffers 62 drive only three bits of the low-order byte of the thirty-two data lines in the data bus 13b, the three high order bytes being accounted for by the Byte-Enable signals as mentioned above or in Table A. Operation of the system proceeds generally as follows: In order to read the ID byte register in the location 11, the CPU first drives "ones" on all of the data bus lines 12b and 13b. The intrinsic capacitance of the data bus lines will ensure that the logic-one (high) voltage on these lines will not disappear instantaneously, but will decay at a rate inversely proportional to the RC time constant for the lines. The CPU next drives the address bus 12a and 13a with the reserved ID byte address in I/O space. All I/O modules in the system have their address bus receivers enabled when an Address Strobe appears on the control bus along with the I/O controls, and are "listening" to the bus for addresses in their range. When the decoder 60 detects the ID byte address on the address bus 13a, the three drivers 62 are enabled and pull down values on the appropriate lines in the data bus 13b to logical low levels (zeroes). The voltages on the undriven bus lines are allowed to decay at their own rate. The CPU then reads the value on the data bus 12b in order to obtain the ID byte for the system 10. According to the present invention, this read from the data bus 12b and 13b should occur before the voltages on the undriven lines are allowed to decay to a voltage below the high threshold voltage for the receiver circuitry 53. In this way, the driven data lines are read as "zeroes" and the undriven data lines are read as "ones".

If the CPU 10 cannot read the data bus 12b very shortly after "pumping" it with "ones", the voltages on the undriven lines may be allowed to decay to indeterminate voltages that can be interpreted as either "zeroes" or as "ones". A circuit according to an embodiment of the present invention thus may use several measures to ensure that the progression of events described above is carried out without interruption. The first of these is to disable the interrupt lines to the CPU module 10, so that the CPU does not enter an interrupt service routine during execution of the ID byte read in the time between writing to the bus and reading the bus; this is done by a "Clear Interrupt" instruction. Also, initiation of the above process is constrained to begin immediately after a memory refresh cycle for the DRAMs in main memory 14. Memory refresh cycles use the system bus to initiate a refresh operation in the dynamic memory devices of the main memory modules, which modules store information as electrical charges on capacitors and must therefore be periodically recharged. Memory refresh cycles occur at regular intervals (typically about once every 15-microseconds) and are non-suppressible. By waiting until just after a refresh cycle has occurred before initiating an ID byte read, it can be assumed that a period of about 15-microseconds will be free of refresh cycles, so another refresh cycle will not occur until after the ID byte read has been completed.

Figure 6:
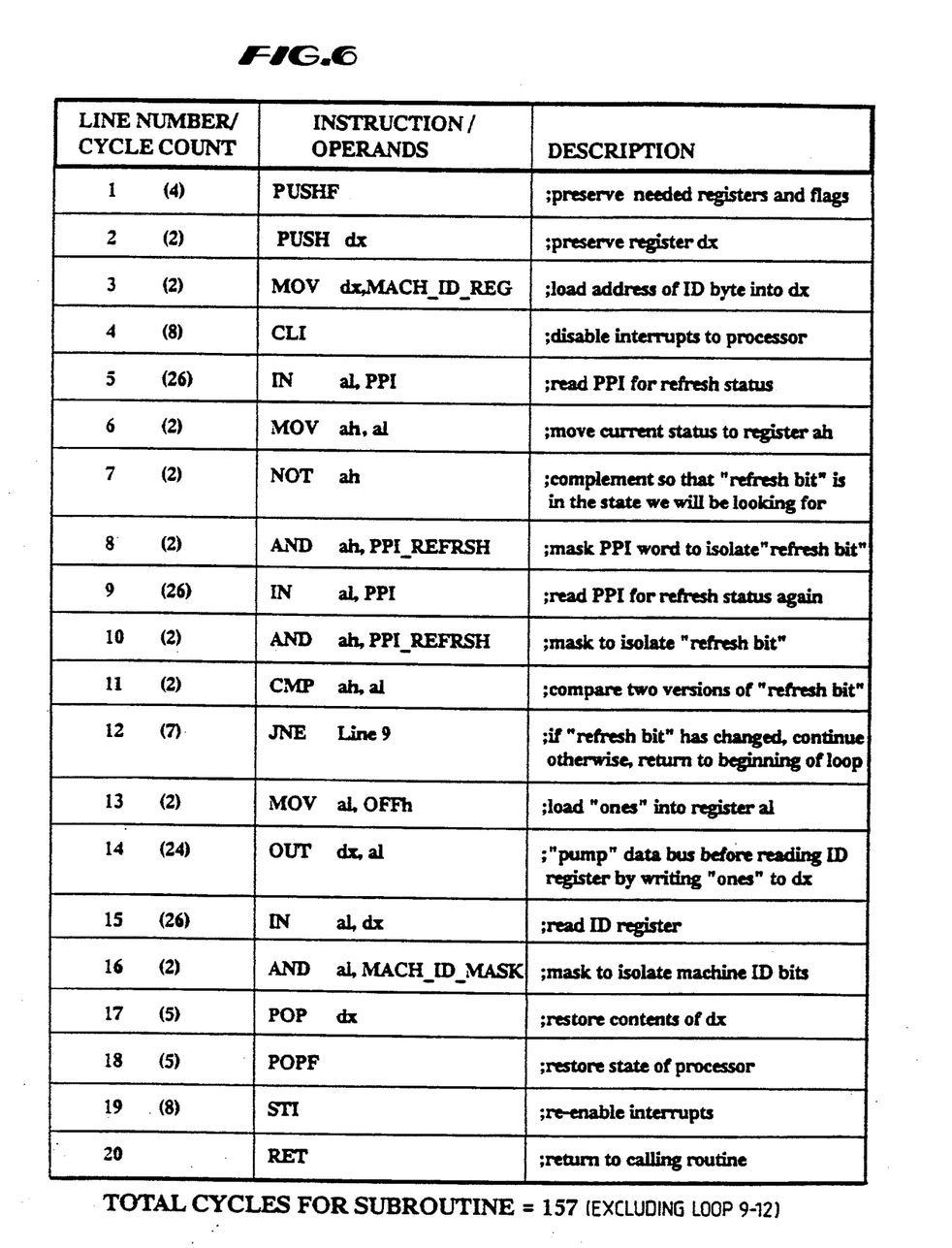
FIG. 6 is a listing of an assembly-language program for accessing the system identifier code according to this embodiment of the invention.

FIG. 6 is a partial machine-language program listing which illustrates specifically how the method of the present invention is utilized in a preferred embodiment to read the ID byte location 11 of the system of FIG. 1. Line-1 of the program is a PUSHF instruction, which causes some of the values of the register file 24 and flags or status in the CPU 10 to be saved in the system stack in memory 14, so that they can be restored at the completion of the ID byte routine. Similarly, in line-2, the contents of a general-purpose register dx of the register file 24 are saved on the system stack using the PUSH instruction. Next, in line-3, the I/O address of the ID byte 11, called MACH_ID_REG, is moved into general-purpose register dx from memory. In line-4, interrupts to the CPU are disabled using the Clear Interrupt (CLI) instruction. This ensures that no device in the system 10 can cause the processor to service an interrupt during the execution of the rest of the routine shown in FIG. 2.

In order to ensure that the reading of the ID byte 11 will not be interrupted by a refresh cycle for the DRAM chips of memory 14, execution of the ID byte read should occur immediately after a memory refresh, so that it can be known that another one will not occur for a certain period of time, namely the refresh cycle time. The number of machine cycles required to perform each of the instructions in the ID byte read subroutine is also included in FIG. 2. The entire ID byte read subroutine, after detecting Refresh until the byte is read, from line 9 through line 15, takes at most 89 machine cycles to execute. If the microprocessor in the CPU module 10 operates at a clock speed of 16 MHz, (i.e. 62.5 nanoseconds per cycle) then this part of the subroutine of FIG. 6 would take 5.6 microseconds to execute. Since the period of the refresh cycle is typically on the order of 15-microseconds, starting the ID byte read immediately after a memory refresh allows sufficient time for the ID byte read subroutine to complete without being interrupted by a memory refresh cycle.

In line-5, the IN instruction causes a word (called PPI) to be input from the main memory module and loaded into general purpose register al (in register file 24). The PPI word contains a bit (called the "refresh bit") which describes the refresh status of the memory. Every time a memory refresh cycle occurs, the "refresh bit" is toggled. In line-6 the input word is moved into general-purpose register ah; in line 7, the contents of register ah are negated, and in line-8, the negated word is ANDed to a refresh bit mask, so that the resulting word in register ah contains all "zeroes" except for the "refresh bit" position, which may be a "zero" (if it was read in line-5 as a "one") or a "one" (if it was read in line-5 as a "zero").

Line-9 through line-12 comprise a loop which causes the CPU to wait until a memory refresh cycle has occurred before reading the ID byte. In line-9, the input word (PPI) from the main memory is re-read, and the refresh bit is ANDed with the refresh bit mask, in line-10, before being compared, in line-10, with the previously read and masked value of the "refresh bit". Since the value of the first reading (in line-5) of the "refresh bit" was negated before being compared with the value of the second reading (in line-9), if the value in the "refresh bit" position is found (in line 11) to be the same in both words, it must have been toggled during the time between the first and second reading of the PPI word. In line-12, if the comparison reveals that the "refresh bit" has been toggled, execution is redirected to line-13, while if not, execution returns to line-9, where another comparison is performed.

Once the program can determine that the "refresh bit" has been toggled, execution of the program can continue without interruption for the period of the refresh cycle. In line-13, general purpose register al is loaded with logic-ones, FF(hex). In line-14, the data bus 12b and 13b is "pumped" by writing the "ones" in register al onto the data bus 12b. Immediately thereafter, in line-15, the ID byte is read. In line-16, the ID bits are masked, and the result stored in general-purpose register al.

The previous state of the processor is restored in line-17 and line-18, and interrupts to the processor are re-enabled in line-19. The Return From Procedure (RET) statement in line-20 causes microprocessor execution to be resumed at the point where the ID byte read subroutine was called.

From the above detailed description of a specific embodiment of the present invention, it will be evident that a method for reading a variable bit field via a bus having only some of its lines driven has been disclosed. The method described was particularly adapted to the reading of a system ID byte, but can be used, in its broader aspects, to read any variable bit field from a bus in which some of the bus lines are driven, while other lines are left in their default tri-state condition.

While this invention has been described with reference to a specific embodiment, this description is not meant to be construed in a limiting sense. Various modifications of the disclosed embodiment, as well as other embodiments of the invention, will be apparent to persons skilled in the art upon reference to this description. It is therefore contemplated that the appended claims will cover any such modifications or embodiments as fall within the true scope of the invention.

TABLE A—CONTROL BUS

M/IO#, D/C#, W/R# and LOCK# are cycle definition signals, setting forth the type of cycle the CPU 10 is executing on the bus 12. M/IO# selects a memory reference if high, or an I/O reference if low. D/C# says whether the access is for data (if high) or for code (if low); this signal can be used to differentiate between accessing instructions and accessing data. W/R# is the write/read control, specifying a write operation if high or a read operation if low. Lock# forces a condition where the CPU 10 maintains control of the bus 12 and cannot be interrupted by another master.

ADS# is an address status signal, and indicates that new address and cycle definition information is available on the bus 12a and 12c; this signal begins every external access by the CPU 10.

READY# is a transfer acknowledge input to the CPU and terminates a cycle on the local bus 12 by signalling to the CPU 10 for a read cycle that the data on the bus 12b is ready to be latched into the CPU or that a write has been completed or posted. Every CPU bus cycle must end with READY# asserted.

NA# is the next-address request, used to initiate address pipelining by indicating that the system is prepared to accept new values of address, byte enable, and cycle definition, even if the end of the current cycle has not been acknowledged on READY#.

HOLD and HLDA are bus arbitration signals, where HOLD is asserted as an input to the CPU 10 when another device requires control of the bus, and the CPU 10 asserts hold-acknowledge HLDA when it relinquishes control of the bus in response to HOLD.

INTR is a maskable interrupt request input to the CPU, and when asserted the CPU executes an interrupt acknowledge cycle in which an interrupt vector is latched into the CPU from the data bus 12b.

Clock Clk2 is the same clock for both the CPU 10 and the controller 11, and is divided by two internally to produce the internal clock Clk. In the example, the Clk frequency is perhaps 20-MHz, so the Clk2 frequency is 40-MHz.

BE0#-BE3# are Byte Enable signals defining which ones of the four bytes in the 32-bit doubleword on data bus 12b being accessed are wanted by the CPU 10. These signals are used in the 80386, but not in the 80386SX.

What is claimed is:

1. A computer system having memory and data locations, comprising:
   a) a CPU with means for fetching and executing instructions from the memory and performing operations, the CPU including an address space;
   b) system bus means including an address bus and a data bus with capacitive effects, the system bus means being coupled to the memory and said CPU, wherein the data bus is comprised of a first number of data lines;
   c) a reference data location within said address space of the CPU and coupled to said system bus means; said reference data location storing a second number of data bit values identifying a configuration parameter of the computer system and driving only said second number of data bit values onto a second number of said first number of data lines of said data bus when said reference data location is read, said second number being less than said first number and said data lines other than said second number of data lines being undriven when said reference data location is read;
   d) and writing and immediately thereafter reading means coupled to said system bus means for writing to said first number of data lines of said data bus preselected data of known value and then immediately thereafter reading a first number of data bit values from said first number of data lines, said data bit values on said second number of data lines being provided by said reference data location and said data bit values on said data lines other than said second number of data lines being provided by said preselected data of known value previously written to said data lines other than said second number of data lines, said preselected data of known value having been retained on said data lines other than said second number of data lines during said reading due to said capacitive effects on said data bus.

2. A system according to claim 1, wherein a plurality of functions are performed in the computer system utilizing said system bus means and wherein said system includes means coupled to said system bus means for detecting when a preselected function is performed, said writing and immediately thereafter reading means writing said preselected data immediately after said detecting means detects said preselected function.

3. A system according to claim 2 wherein said preselected function is a refresh of the memory connected to said system bus means.

4. A system according to claim 1 wherein said second number of data bit values from said reference data location are set to logic zero values, and said preselected data of known value comprises logic-one values.

5. A system according to claim 4 wherein said logic-zero values are at a voltage of ground, and said logic-one values are at a positive voltage of about that used as a power supply for said CPU.

6. A system according to claim 1 wherein said reference data location is coupled to said data bus and includes a second number of locations for storing said second number of data bit values, the system further comprising:
   a second number of tri-state buffers associated with each of said second number of data bit values coupled between said data bit value locations in said reference data location and said second number of data lines.

7. A system according to claim 1 wherein said second number is less than eight, and said reference data location stores said second number of data bit values at variable locations within a byte mixed with unused bits of said byte, said writing and immediately thereafter reading means becoming operational and writing to said first number of data lines of said data bus preselected data of known value and then immediately thereafter reading a first number of data bit values from said first number of data lines, said data bit values on said second number of data lines being provided by said reference data location and said data bit values on said data lines other than said second number of data lines being provided by said preselected data of known value previously written to said data lines other than said second number of data lines, said preselected data of known value having been retained on said data lines other than said second number of data lines during said reading due to said capacitive effects on said data bus.

8. A method of operating a digital system having a data bus with capacitive effects comprised of a first number of data lines, including the steps of:
   a) writing to the first number of data lines of the data bus of said system a preselected data value, wherein said step of writing drives the first number of data lines of the data bus to known logic values;
   b) immediately after writing said preselected value reading a first number of data bit values from a data location coupled to the data bus storing a second number of data bit values identifying a configuration parameter of the digital system, wherein said second number is less than a the first number; and
   c) the data location driving said second number of data bit values onto only a second number of the first number of data lines during said data location reading, the data lines not driven by said data location entering an undriven state and still retaining said preselected values during said data location reading due to the capacitive effects on the data bus and providing said retained preselected values during said reading a first number of data bit values.

9. A method according to claim 8 wherein said digital system is a computer executing instructions, and said step of reading is performed by an instruction executed immediately after an instruction performing said step of writing.

10. A method according to claim 9, wherein execution of an instruction by said computer requires a plurality of machine cycles of said computer.

11. A method according to claim 8 wherein said preselected data value is a field of logic-one bits and wherein said second number of data bit values include logic-zero bits as intentional data.

12. A method of identifying characteristics of a digital system having a data bus with capacitive effects comprised of a first number of data lines, and a CPU coupled to the data bus, including the steps of:
   a) storing a multiple-bit identifying code at a selected location coupled to the data bus addressable by the CPU in said system, wherein said multiple-bit identifying code identifies a configuration parameter of the digital system and wherein less than all of the bits at said location includes bits of said code;
   b) writing a preselected data value to the first number of data lines of the data bus of said system addressable at said location, wherein said step of writing drives said data lines to known logic values;
   c) immediately after writing said preselected value, reading a first number of data bit values from said selected location to detect said identifying code; and
   d) said data location driving said identifying code onto a number of the first number of data lines less than said first number during said read operation, the data lines not driven by said data location entering an undriven state and still retaining said preselected values during said data location reading due to the capacitive effects on the data bus and providing said retained preselected values during said reading a first number of data bit values.

13. A method according to claim 12 wherein said digital system is a computer executing instructions via said CPU, and said step of reading is performed by an instruction executed immediately after an instruction performing said step of writing.

14. A method according to claim 12 wherein said preselected data value is a field of logic-one bits and wherein said identifying code includes logic-zero bits as intentional data.

15. A method according to claim 14 including the step of disabling interrupts of said CPU just prior to said step of writing.

16. A method according to claim 15, wherein the CPU executes refresh operations for dynamic memory coupled to the data bus; and
   wherein said step of writing is performed after said CPU has just executed one of said refresh operations.

17. A method according to claim 12 wherein said digital system is a computer executing instructions via said CPU, with each instruction requiring at least one machine cycle of said CPU, and said step of reading is performed by a first instruction executed immediately after a given instruction performing said step of writing, each of said first instruction and said given instruction requiring more than one said machine cycle of said computer.

18. A system according to claim 1, wherein said writing and immediately thereafter reading means writes said preselected data of known value to said first number of data lines.

19. A method according to claim 8, wherein said step of writing includes writing said preselected data value to the first number of data lines.

* * * * *